United States Patent [19]
Yamato et al.

[11] Patent Number: 6,142,514
[45] Date of Patent: Nov. 7, 2000

[54] AIR BAG GAS INFLATOR

[75] Inventors: Yo Yamato; Mithuhiko Fukabori, both of Hyogo, Japan

[73] Assignee: Daicel Chemical Industries, Ltd., Osaka, Japan

[21] Appl. No.: 09/135,004

[22] Filed: Aug. 17, 1998

[51] Int. Cl.[7] .................................................. B60R 21/26
[52] U.S. Cl. ......................... 280/736; 280/741; 280/737
[58] Field of Search .................................. 280/736, 741, 280/734, 728.1, 737, 742, 735

[56] References Cited

U.S. PATENT DOCUMENTS

| | | | |
|---|---|---|---|
| 5,078,422 | 1/1992 | Hamilton et al. | 280/736 |
| 5,330,226 | 7/1994 | Gentry et al. | 280/735 |
| 5,351,988 | 10/1994 | Bishop et al. | 280/737 |
| 5,413,378 | 5/1995 | Steffens, Jr. et al. | 280/735 |
| 5,439,249 | 8/1995 | Steffens, Jr. et al. | 280/735 |
| 5,664,802 | 9/1997 | Harris et al. | 280/736 |
| 5,700,030 | 12/1997 | Goetz | 280/736 |
| 5,851,029 | 12/1998 | Klinger et al. | 280/736 |

*Primary Examiner*—J. J. Swann
*Assistant Examiner*—F. Zeender

[57] ABSTRACT

A gas generator for an air bag that can adjust gas providing amount according to circumstances is provided. The gas generator includes an outer shell vessel, an ignition unit disposed within the vessel, a gas generating material for generating a gas in response to the operation of the ignition unit, a gas generating material accommodation chamber for accommodating the gas generating unit therein, and a gas discharge chamber adjacent to the gas generating material accommodation chamber with a partition wall in between, wherein the gas discharge chamber includes an opening that communicates with the gas generating material accommodation chamber and a discharge port that communicates with the atmosphere, the opening is sealed with a gas sealing plate which is ruptured above a predetermined gas pressure within the gas generating material accommodation chamber, and the gas discharge chamber has, therein, gas discharge stopping unit including a pyrotechnic which is operative upon receiving an operating signal, and a piston member, which is driven by the ammunition to close the opening.

6 Claims, 3 Drawing Sheets

AIR BAG GAS INFLATOR

DETAILED DESCRIPTION OF THE INVENTION

1. Field of the Art to which the Invention Pertains

The present invention relates to a gas generator for an air bag that protects a driver or a passenger from an impact, and more particularly to a gas generator capable of adjusting the amount of a supply gas in accordance with the circumstances.

2. Prior Art

For the purpose of protecting a driver or a passenger from an impact in a vehicle collision, a vehicle is equipped with an air bag device. The air bag device includes a sensor, a control unit, gas generator, an air bag, etc. The gas generator includes an ignition unit and a gas generating material.

Upon detection of an impact by the sensor, a detection signal is supplied to the control unit, which conducts arithmetic calculation in response to the detection signal. The control unit generates an output signal representative of the result of the arithmetic calculation to the ignition unit. The ignition unit is thus operated. With this operation, the gas generating agent of the gas generating material is burned to generate gas having a high temperature and a high pressure, and the gas is injected into the air bag (bag body) from a diffuser of the gas generator. As a result, the air bag is inflated to form a cushion that absorbs an impact between a solid structure and the driver or passenger.

In a conventional gas generator for an air bag device, the capacity of an air bag, the amount of gas generating material, and so on are determined so that an optimum inflation rate of the air bag, an optimum internal pressure in the air bag, etc., are obtained on the presumption of a certain standard condition. However, there may occur a case where a preset condition is changed de pending on a vehicle velocity, a vehicle room temperature, a physique of a driver or a passenger, the sitting posture of the driver or the passenger, whether the driver or the passenger is being restrained by a seat belt or not, and so on at the time of operating the air bag device. In such a situation, with a certain standard amount of a sup ply gas, the optimum inflation rate of the air bag, the optimum internal pressure in the air bag, and so on cannot be obtained.

SUMMARY OF THE INVENTION

The object of the present invention is to provide a gas generator for an air bag, which is capable of adjusting the amount of a supply of gas in accordance with the circumstances.

The gas generator for an air bag, according to the present invention, includes: an outer shell vessel having a pressurized gas accommodating chamber for storing a gas therein and a diffuser nozzle, provided at an opening of the outer shell vessel, having gas discharge ports in communication with the air bag, the opening being covered by a rupturable partition wall;

ignition unit disposed within the outer shell vessel and operates upon receiving an operation signal; and a gas generating material for generating gas when the ignition unit operates, wherein the outer shell vessel includes a gas discharge chamber having an opening in communication with the pressurized gas accommodating chamber, and a discharge port in communication with an atmosphere, the opening is closed by a gas sealing plate that ruptures by a predetermined gas pressure in the pressurized gas accommodating chamber, and the gas discharge chamber is provided with a pyrotechnic that activates when receiving the operation signal, and a gas discharge stopping unit having a piston member activated by the pyrotechnic to close the opening.

It is preferable that the piston member has a conical closing portion which abuts the peripheral portion of the opening to close the opening.

The closed portion may have a sharp tip or a flat tip.

A cylindrical protrusion may be formed on the tip of the closed portion.

The gas generation material may be mainly made of any one of a solid gas generation agent, a pressurized gas and a liquid which is gasified by heating.

The pyrotechnic may be formed of an electric ignition unit.

The gas generator of the present invention includes the gas discharge chamber adjacent to the pressurized gas accommodating chamber with the partition wall in between, and the gas discharge chamber includes the opening that communicates with the pressurized gas accommodating chamber, and a discharge port that communicates with the atmosphere. The opening is sealed with the gas sealing plate, which is ruptured by a predetermined gas pressure within the pressurized gas accommodating chamber. The gas discharge stopping unit is disposed in the gas discharge chamber, and the gas discharge stopping unit includes the pyrotechnic which operates upon receiving the operation signal, which is different from the operation signal for the ignition unit, and the piston member driven by the pyrotechnic to close the opening.

In the gas generator of the present invention, a gas is generated by the gas generating material as a result of the operation of the ignition unit. When the pressure of the generated gas ruptures the gas sealing plate, a part of gas passes through the opening from the pressurized gas accommodating chamber (the main body) to the gas discharge chamber, and is then discharged from the discharge port in the gas discharge chamber to the atmosphere. When the gas discharge stopping unit is operated upon receiving the operating signal, the piston member closes the opening, to thereby stop the discharge of the gas from the gas discharge chamber. In this situation, the entire generated gas is provided to the air bag. In this way, the gas generator of the present invention can adjust the amount of supply gas according to the circumstances. The ignition unit and the gas discharge stopping unit operate simultaneously or with an appropriate time log. As a result, a plurality of gas supply patterns are generated, thereby variously changing the inflating pattern of the air bag.

The operating signal can be obtained from a control unit of the air bag device, which contains the gas generator of the present invention. The control unit receives detection signals from a variety of sensors, such as a vehicle velocity sensor, a temperature sensor that detects the room temperature of the vehicle, a displacement sensor for detecting the physique of a driver or a passenger, the sitting posture of the driver or the passenger, etc., to arithmetically calculate the detection signal.

As described in the foregoing, the present invention realizes a gas generator for an air bag that can adjust the gas supply amount in accordance with the situation. Namely, the gas generator either discharges a part of the gas by activating the gas discharge stopping unit, supplies the entire gas to the air bag, or stops the supply of the gas after discharging a part of the gas to maintain the internal pressure of the air bag to an optimum value. Further, the deployment pattern of the air bag can be changed in various ways, such as inflating the air bag at a relatively low rate in an initial stage, and inflating it at a relatively high rate in a latter stage.

DETAILED DESCRIPTION OF THE PREFERRED EMBODIMENTS

Figure 1:
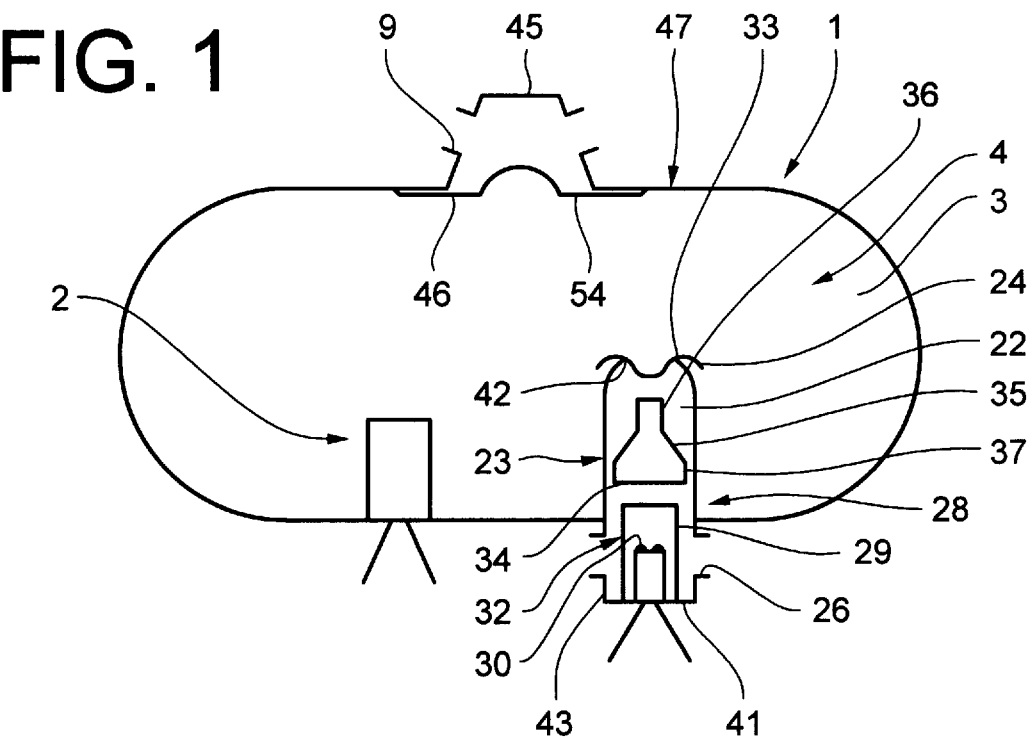
FIG. 1 is a schematic cross-sectional view showing a gas generator for an air bag in accordance with one embodiment of the present invention.

Now, a description will be given in more detail of various embodiments of the present invention. FIG. 1 is a schematic diagram showing a gas generator for an air bag in accordance with one embodiment of the present invention. This is a gas generator for a driver's seat. The gas generator is a hybrid-type gas generator that uses pressurized gas as a gas generating material.

The gas generator includes an outer shell vessel 1, an ignitions unit 2 disposed within the vessel 1, pressurized gas 3 stored in the outer shell vessel, and a pressurized gas accommodation chamber 4 for accommodating the pressurized gas 3.

The outer shell vessel 1 has a main body 47 having an elliptic cross-section and an opening 46 in the center of the upper portion of the main body 47. The opening 46 is connected to an opening of a diffuser nozzle 45, which is conical in shape with a flat tip. The opening 46 is air-tightly closed by a partition wall 54, which is a gas tight-sealing wall designed to rupture above a predetermined gas pressure. The pressurized gas 3 is accommodated in the pressurized gas accommodation chamber 4, which is formed of the main body 47, and a gas discharge outlet 9 is disposed in the outer peripheral wall of the diffuser nozzle 45. The pressurized gas 3 may be an inert gas, for example, argon, nitrogen, helium, or the like.

Figure 2:
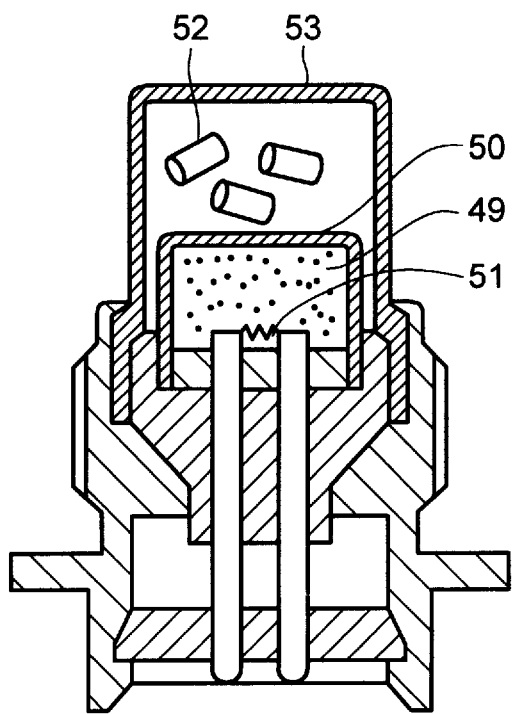
FIG. 2 is a schematic cross-sectional view showing ignition means of the gas generator.

The ignition unit 2, as shown in FIG. 2, includes an igniter vessel 50, which is filled with an igniter 49, a resistance heating body disposed within the vessel 50, that is, a nichrome wire 51, and a gas generating agent vessel 53 disposed to surround the igniter vessel 50 and accommodates a solid gas generating agent 52 inside thereof. The nichrome wire 51 is connected to an electric connector pin 54 to be heated by electricity. The igniter may be, for example, a mixture of $KClO_4$ (potassium perchlorate) and Zr (zirconium). A black gunpowder can be disposed within the gas generating agent vessel 53 instead of the gas generating agent, or together with the gas generating agent.

As shown in FIG. 1, the gas generator in this embodiment has a gas discharge chamber 22 adjacent the pressurized gas accommodation chamber 4. The gas discharge chamber 22 is made of a cylindrical member 23, and connected to the pressurized gas accommodation chamber 4 through the cylindrical member 23. A part of the cylindrical member 23 is disposed within the outer shell vessel, that is, within the unit pressurized gas accommodation chamber 4, whereas the remaining part thereof is located outside the outer shell vessel, that is, in the atmosphere.

The gas discharge chamber 22 has an opening 42 and a discharge port 26. The opening 42 is disposed inside the pressurized gas accommodation chamber of the cylindrical member 23, that is, at the top thereof, to make the pressurized gas accommodation chamber 4 communicate with the gas discharge chamber 22. A discharge port 26 is disposed in a part of the cylindrical member 23, which is exposed to the atmosphere, that is, disposed in the peripheral wall portion 43 to make the gas discharge chamber 22 communicate with the atmosphere. The discharge port 26 is arranged at a position where a gas injected from the discharge port 26 does not blow in the direction of the driver or the passenger. Further, the number and the area of the discharge port 26 can be appropriately selected in accordance with a required performance.

The opening 42 is sealed with the gas sealing plate 24, and the gas sealing plate 24 is formed of a thin metal plate which is designed to be ruptured above a predetermined gas pressure within the pressurized gas accommodation chamber 4.

A gas discharge stopping unit 28 is disposed in the gas discharge chamber 22. The gas discharge stopping unit 28 includes a pyrotechnic 32, which operates upon receiving an operating signal, and a piston member 33, which is driven by the pyrotechnic 32 to close the opening 42.

The pyrotechnic 32 includes an explosive vessel 29 for accommodating an explosive therein, and a nichrome wire 30, which is disposed in the explosive vessel 29 and heats by electrification. The tip of the explosive vessel 29 is positioned close to a bottom plane 34 of the piston member that forms a pressure receiving surface so that the explosion force is concentrated on the bottom plane 34. It should be noted that as the pyrotechnic 32, an electric ignition unit used as the ignition unit of the gas generator can be used.

The piston member 33 has a conical closed portion 35. A cylindrical protrusion 36 is formed on top of the closed portion 35. The conical closed portion 35, when the piston member 33 is driven, abuts the peripheral portion of the opening 42 to close the opening 42. An annular gap 37 is defined between the bottom cylindrical portion of the piston member 33 and the cylindrical member 23, and the gap 37 functions as a gas passage. There can be formed, in the gap 37, a piston member support member, which is designed to be destroyed when the piston member 33 is driven.

Figure 3:
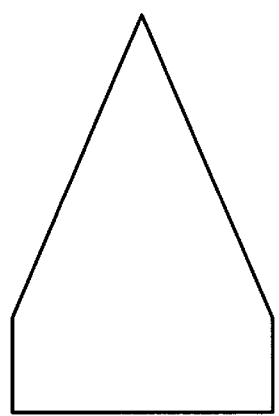
FIG. 3 is a diagram showing another shape of a piston portion of the gas generator in accordance with the present invention.
Figure 4:
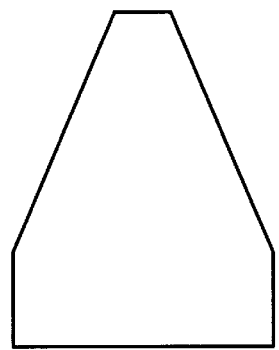
FIG. 4 is a diagram showing still another shape of the piston portion.

The pyrotechnic 32 may be operated simultaneously with the ignition unit 2. In such an operation, the gas sealing plate 24 is ruptured by the cylindrical protrusion 36 of the piston member. The closed portion 35 may have a sharp-tip conical shape, as shown in FIG. 3, or a plane-top conical shape as shown in FIG. 4.

While the piston member 33 closes the opening 42, a part of the piston drive pressure may escape from the discharge port 26. For that reason, the pyrotechnic 32 may have a predetermined amount of gunpowder capable of maintaining the closing of the opening by the piston member.

In the gas generator thus organized, in accordance with this embodiment, upon sensing an impact by a sensor (not shown), a detection signal is supplied to the control unit (not shown), which arithmetically operates the detection signal to generate an output signal representative of the result of an arithmetic calculation, and the output signal is supplied to the ignition unit 2. In the ignition unit 2, when the nichrome wire 51 is heated by electrification, then the igniter 49 is ignited and burned, to thereby generate a gas with a high temperature and a high pressure. The gas ruptures the wall of the gas generating agent vessel 53 and injects into the pressurized gas accommodation chamber 4 outside thereof. The injected gas is mixed with the pressurized gas 3 within the pressurized gas accommodation chamber 4, and heats the pressurized gas 3. The heating of the pressurized gas 3 expands the pressurized gas. The mixed gas consisting of the expanded pressurized gas and a gas generated by the gas generating agent of the ignition unit ruptures the gas tight-sealing wall 54 and is then injected into the air bag through the gas discharge outlet 9.

The gas discharge stopping unit 28 of the gas generator, in accordance with this embodiment, can be controlled by an operation as stated below.

For example, when the room temperature of the vehicle is high, the air bag is inflated with an excessive internal pressure. In such a case, the control unit conducts an arithmetic calculation on the basis of a signal from the temperature sensor that detects the room temperature to output its result as on off signal. The gas discharge stopping unit 28 is rendered inoperative in response to the off signal.

When the gas discharge stopping means 28 is inoperative, the above mixed gas ruptures the gas sealing wall 54 and ruptures the gas sealing plate 24 that closes the opening 42. In this situation, the pressurized gas accommodation chamber 4 communicates with the gas discharge chamber 22, and a part of the gas within the pressurized gas accommodation chamber 4 enters the gas discharge chamber 22 through the opening 42 and discharged to the atmosphere from the discharge port 26 of the gas discharge chamber 22. As a result, the air bag is inflated with an appropriate internal pressure.

Further, when the vehicle collides with something at a high speed, the control unit outputs the operating signal to the ignition unit 2, and conducts arithmetic calculation on the basis of a signal from the vehicle velocity sensor, that detects the vehicle velocity, to output an on signal. The gas discharge stopping unit 28 is operated in response to the on signal.

Figure 5:
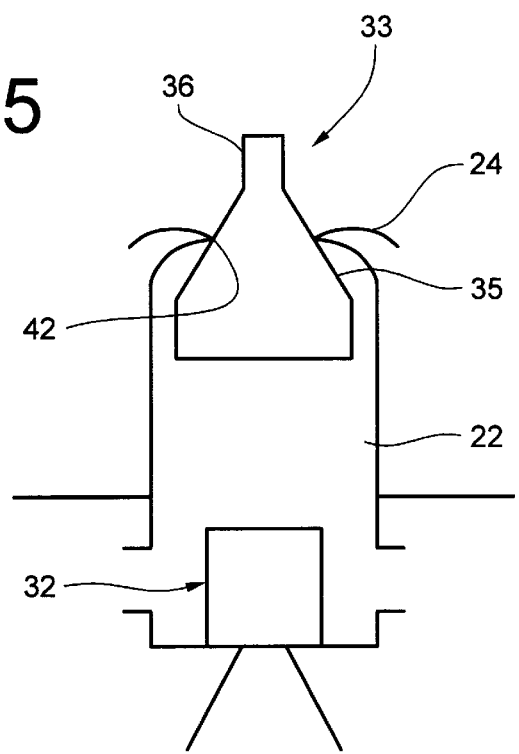
FIG. 5 is a schematic diagram showing a state of the operation of gas discharge stopping means of the gas generator shown in FIG. 1.

In the gas discharge stopping unit 28, when the nichrome wire 30 is heated in response to the operating signal from the control unit, the gunpowder within the gunpowder vessel 29 is ignited, and its explosion force moves the piston member 33. The movement of the piston member 33 makes the cylindrical protrusion 36 rupture the gas sealing pate 24 as shown in FIG. 5, and the conical closed portion 35 of the piston member is abutted against the peripheral portion of the opening 42 to make the opening 42 close. As a result, the gas discharge from the gas discharge chamber 22 is stopped, and the entire amount of the generated gas is supplied to the air bag. Hence, the air bag is inflated at high speed.

Figure 6:
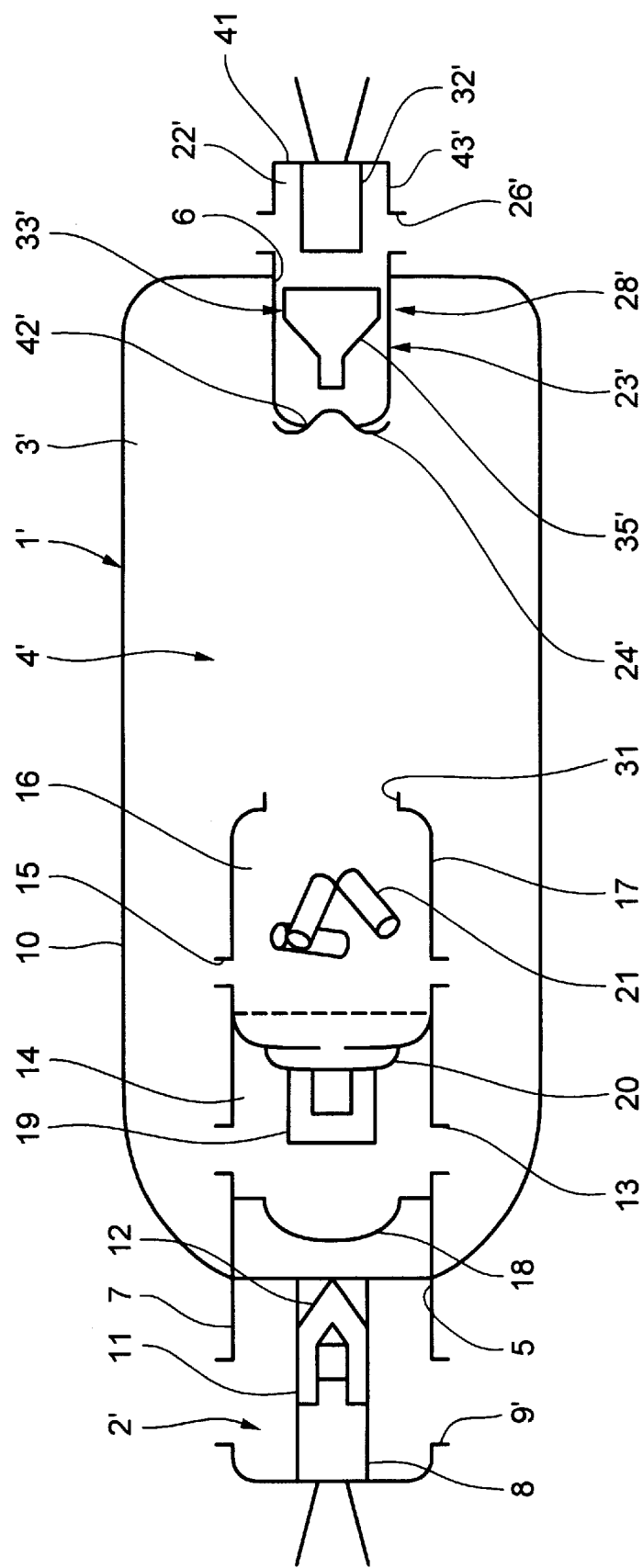
FIG. 6 is a schematic cross-sectional view showing a gas generator for an air bag in accordance with another embodiment of the present invention.

FIG. 6 is a schematic diagram showing a gas generator for an air bag in accordance with another embodiment of the present invention. This gas generator is a hybrid-type gas generator for a passenger side seat, and uses a pressurized gas as a generating material.

The gas generator includes an outer shell vessel 1', as ignition unit 2' disposed within the outer vessel, pressurized gas 3' stored in the outer vessel, and a pressurized gas accommodation chamber 4' for accommodating the pressurized gas 3'.

The outer vessel 1' includes a cylindrical body 10 having openings 5 and 6 at both ends thereof. One end opening 5 of the body 10 is connected with an opening of a cylindrical diffuser nozzle 7. One end of the nozzle 7 is closed. The cylindrical diffuser nozzle 7 has a gas discharge outlet 9' on its outer peripheral wall, and a sleeve member 11 inside thereof. Ignition means 2' is disposed within the sleeve member 11.

The ignition unit 2' includes an igniter vessel 8, which is filled with an igniter, and an injection body 12, which is fitted into the vessel 8 and slidable within the sleeve member 11.

The pressurized gas 3' is accommodated in the pressurized gas accommodation chamber 4', which is formed of the main body 10, and also filled into the piston member accommodation chamber 14 through the opening 13 and into the gas generating agent accommodation chamber 16 through the openings 31 and 15.

In the pressurized gas accommodation chamber 4', the pressurized gas 3' and the cylindrical member 17 are accommodated. Both ends of the cylindrical member 17 are opened, and an opening at one end thereof is connected with the opening 5 of the main body 10. Within the cylindrical member 17, a gas sealing wall 18 that is a partition member closing the opening 5, a piston member 19, a booster 20, and a gas generating agent 21 are provided. The gas sealing wall 18 is formed of a rupturable thin film and disposed between the injection body 12 and the opening 13. The gas sealing wall 18 air-tightly isolates the inside of the diffuser nozzle 7 from the pressurized gas accommodation chamber 4.

The gas generator of the present embodiment has a gas discharge chamber 22'. The gas discharge chamber 22' is formed of a cylindrical member (partition member) 23', and it is disposed adjacent to the pressurized gas accommodation chamber 4' via the cylindrical member 23'. The cylindrical member 23' is fitted into the opening 6 of the vessel body 10 and air-tightly fixed to the opening 6. A part of the cylindrical member 23' is disposed within the pressurized gas accommodation chamber 4', and the remaining part is exposed to the atmosphere.

The gas discharge chamber 22' has an opening 42' and a discharge port 26'. The opening 42' is disposed at the tip of the cylindrical member 23' and communicates the pressurized gas accommodation chamber 4' with the gas discharge chamber 22. The discharge port 26' is defined in the peripheral wall 43' of the cylindrical member 23' and makes the gas discharge chamber 22' communicate with the atmosphere. It should be noted that the discharge port 26' may be provided in other locations, for example, in the end wall 41 as long as the gas injected from the discharge port 26' does not blow towards the driver/passenger.

The opening 42' is sealed by the gas sealing plate 24', which is ruptured above a predetermined gas pressure within the pressurized gas accommodation chamber 4'.

A gas discharge stopping unit 28' is disposed in the gas discharge chamber 22'. The gas discharge stopping unit 28' includes a pyrotechnic 32', which is operated upon receiving an operating signal, and a piston member 33', which is driven by the pyrotechnic 32' to close the opening 42'. The structure of the pyrotechnic 32' and the piston member 33' is the same as that shown in FIG. 1, and therefore its description will be omitted.

In the gas generator thus organized in accordance with the present embodiment, when a sensor detects an impact, a detection signal is supplied to the control unit, which arithmetically calculates the detection signal to generate an output signal representative of the arithmetic calculation result, and the output signal is supplied to the ignition unit 2'. At this time, the heating body within the igniter vessel 8 is heated, thereby burning the igniter to generate a gas. The pressure of the generated gas moves the injection body 12 and ruptures the gas sealing wall 18. In this operation, the pressurized gas 3', within the pressurized gas accommodation chamber 4', is injected into the air bag (not shown) through the gas discharge outlet 9'. The air bag is inflated at a relatively low rate. When the injection body 12 further moves and hits the piston member 19, the booster 20 is ignited, and the gas generating agent 21 is burned with the ignition of the booster 20. The combustion gas is injected from the openings 31 and 15, and mixed with the pressurized gas 3' while heating the pressurized gas 3'. The mixed gas consisting of the pressurized gas 3', which is inflated by heating, and the combustion gas of the gas generation agent 21 is injected into the air bag through the opening 13 and the gas discharge outlet 9'. Because of the new addition of the mixed gas, the inflation rate of the air bag is thereafter increased. As a result, the air bag forms a cushion in front of the passenger to protect the passenger from the impact.

The gas generator according to this embodiment can adjust the amount of supply gas by controlling the operation of the gas discharge stopping unit 28'. When the gas discharge stopping means 28' is inoperative, a part of the gas within the pressurized gas accommodation chamber 4' enters the gas discharge chamber 22' through the opening 42' and is then discharged to the atmosphere from the discharge port 26'. When the gas discharge stopping unit 28' is operative, the conical closed portion 35' of the piston member abuts the peripheral portion of the opening 42' to close the opening 42'. As a result, the gas discharged from the gas discharge chamber 22' is stopped, and all the generated gas is supplied to the air bag. The operation of the gas discharge stopping unit 28' is the same as that of the gas discharge stopping unit 28 of the gas generator shown in FIG. 1, and therefore its description will be omitted.

What is claimed:

1. A gas generator for an air bag, comprising:

an outer shell vessel having a pressurized gas accommodating chamber for storing a gas therein, a first opening and a second opening for discharging the gas from said gas accommodating chamber, said first opening being sealed by a rupturable partition wall such that the gas is released into the air bag when said rupturable partition wall is ruptured;

ignition means disposed within said outer shell vessel and adapted to rupture said partition wall upon receiving a first operation signal;

gas generating means for generating gas to increase a pressure of the gas inside said gas accommodation chamber when said ignition means operates; and a gas discharge chamber for selectively prohibiting the gas from being discharged from said second opening, said gas discharge chamber including, a discharge port in communication with an atmosphere, a gas sealing plate for sealing said second opening, said gas sealing plate ruptures and releases the gas when said ignition means operates and the pressure of the gas inside the gas accommodation chamber increases, a pyrotechnic that activates upon receiving a second operation signal, and a piston member that moves, upon activation of said pyrotechnic, from a first position that permits the gas to discharge from said second opening, and a second position that closes said second opening to prohibit the gas from being discharged from said second opening.

2. A gas generator for an air bag as claimed in claim 1, wherein said piston member has a conical closing portion which abuts the peripheral portion of said second opening to close said opening.

3. A gas generator for an air bag as claimed in claim 2, wherein said closing portion has one of a sharp head and a flat tip.

4. A gas generator for an air bag as claimed in claim 2, wherein a cylindrical protrusion is formed on a tip of said closing portion.

5. A gas generator for an air bag as claimed in claim 1, wherein said gas generating means includes any one of a solid gas generating agent, pressurized gas, and a liquid which is gasified by heating.

6. A gas generator for an air bag as claimed in claim 1, wherein said pyrotechnic includes an electric ignition unit.

* * * * *